(12) United States Patent
Troup et al.

(10) Patent No.: US 7,878,515 B1
(45) Date of Patent: Feb. 1, 2011

(54) INFANT STROLLER

(75) Inventors: Peter Martin Troup, New Orleans, LA (US); Jodee Groner Troup, New Orleans, LA (US)

(73) Assignee: AGT Equities, LLC, New Orleans, LA (US)

( * ) Notice: Subject to any disclaimer, the term of this patent is extended or adjusted under 35 U.S.C. 154(b) by 0 days.

(21) Appl. No.: 12/584,917

(22) Filed: Sep. 15, 2009

(51) Int. Cl.
*B62B 7/00* (2006.01)
(52) U.S. Cl. .................................................. 280/47.38
(58) Field of Classification Search ......... 280/642–647, 280/650–655
See application file for complete search history.

(56) References Cited

U.S. PATENT DOCUMENTS

| | | | | |
|---|---|---|---|---|
| 3,330,575 | A | * | 7/1967 | Boudreau .................. 280/648 |
| 4,506,906 | A | * | 3/1985 | Allden ....................... 280/642 |
| 5,090,724 | A | | 2/1992 | Fiore |
| 5,125,674 | A | * | 6/1992 | Manuszak .................. 280/30 |
| 5,301,963 | A | * | 4/1994 | Chen ........................... 280/30 |

* cited by examiner

*Primary Examiner*—J. Allen Shriver, II
*Assistant Examiner*—Erez Gurari
(74) *Attorney, Agent, or Firm*—Keaty Law Firm

(57) ABSTRACT

A collapsible stroller is configured to allow an infant to sit, stand or lie down in the stroller. The frame of the stroller has outer frame members and inner frame members that interconnect to form a protective enclosure for the infant.

7 Claims, 5 Drawing Sheets

INFANT STROLLER

BACKGROUND OF THE INVENTION

The present invention relates to an infant stroller, and more particularly to a baby stroller in which the baby may transported selectively in a standing, sitting, or reclining position. Small children are often transported in strollers and carriages. When the baby is too young for sitting up, the infant is laid down in the carriage that is pushed by a caregiver. As the child grows, the strollers present a less cumbersome alternative when compared with conventional baby carriages. Strollers are manufactured in a variety of styles, but the basic stroller generally includes a cloth seat, suspended within a wheeled frame. In a stroller, an infant can sit upright or in a partially reclined position, while being strapped by a hip belt and/or shoulder straps.

One of the drawbacks of the strollers is that infants spend a great deal of time confined in a sitting position. Most infants become restless, irritable, and bored when forced to remain seated for a long time. For older babies and toddlers, who have begun to pull up or stand, the tolerance for a restrained seated position may be quite short, because of their inherent desire to stand. When a child learns to stand, it usually holds on to some type of a support for balance, be it a piece of furniture or a parent's hand. However, modern strollers are not equipped to provide support for an infant who is just beginning to stand.

There is a need, therefore, to provide a stroller that could allow an infant to be in a seated position, or in a standing position, when suitable, while a caregiver transports the infant.

The present invention contemplates provision of such a stroller that permits the child to be safely restrained and transported, while being kept in a supported, upright position, and in a safe transported device.

SUMMARY OF THE INVENTION

It is, therefore, an object of the present invention to provide a baby stroller that can accommodate an infant in a seated, standing or reclining position.

It is another object of the present invention to provide an infant stroller that is fully collapsible.

These and other objects of the invention are achieved through a provision of a stroller for transporting an infant selectively in a standing, seated, and lying down position. The stroller has opposing sidewalls, a front wall, a seat and a floor member suspended below the seat. The frame of the stroller has an outer frame subassembly comprising a set of diagonal braces, swivel front wheel sets and rear rotating wheel sets connected by a common axle for rotation in unison. A stroller handle extends upwardly in relation to the set of diagonal braces and is connected at the lower end to the opposing rear diagonal braces. A handrail is secured to upper ends of the diagonal braces and to the stroller handle.

The stroller frame also includes an inner frame subassembly, which is secured inwardly of the outer frame subassembly for supporting the seat and the floor member mounted below the seat. The inner frame subassembly comprises a pair of spaced-apart lateral rods secured to extend in parallel relationship to each other and inwardly of the front and rear diagonal braces of the outer frame subassembly. A first end of each of the pair of lateral rods is secured to a seat back rod at a location below the handrail.

A canopy is secured to the stroller handle for shading an infant in the stroller. A standing space is formed between a front edge of the seat base and the handrail to allow the infant sufficient room for standing in the stroller, while holding onto the handrail.

BRIEF DESCRIPTION OF THE DRAWINGS

Reference will now be made to the drawings, wherein like parts are designated by like numerals, and wherein.

DETAIL DESCRIPTION OF THE INVENTION

Figure 1:
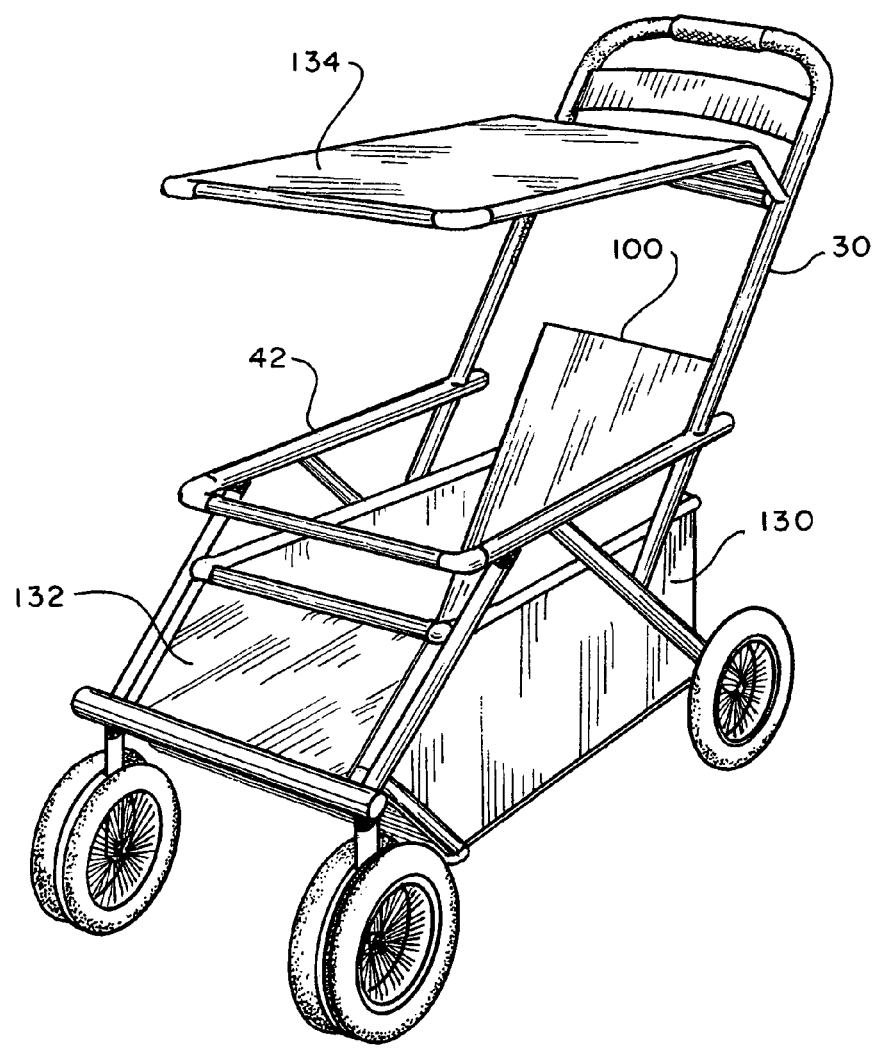
FIG. 1 is a perspective view of the frame of the infant stroller according to the present invention.
Figure 2:
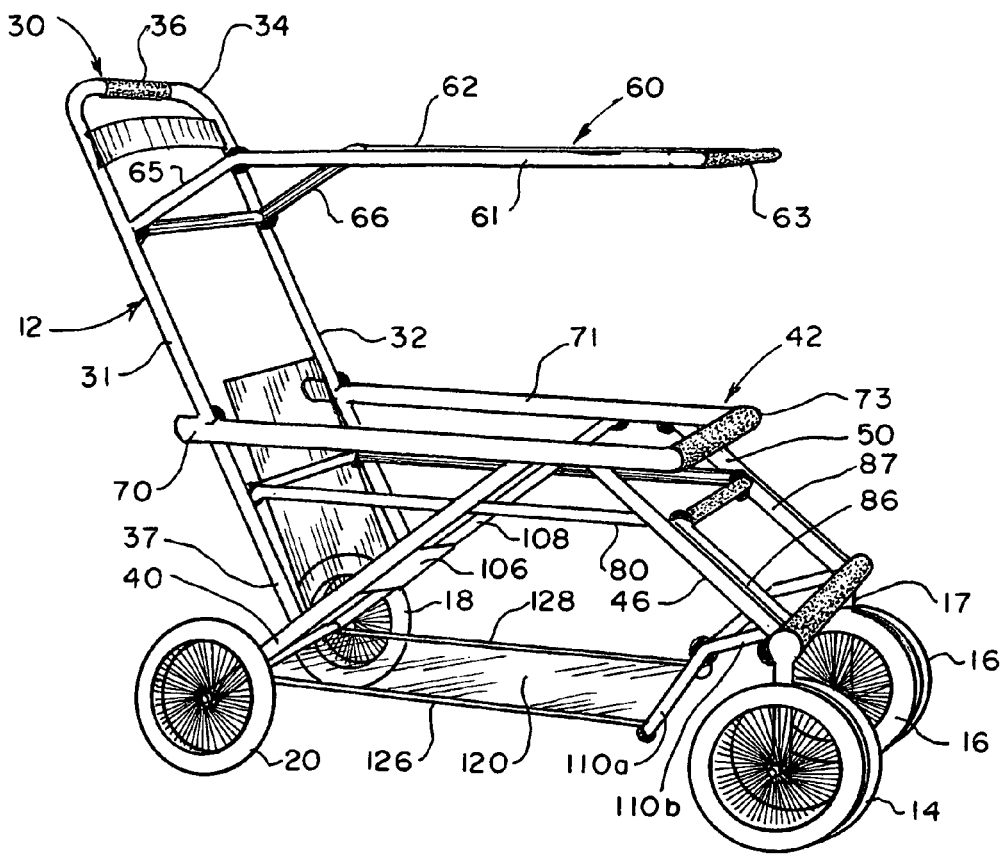
FIG. 2 is a perspective view of the infant stroller of the present invention, with a canopy cover, front wall, and sidewalls removed for clarity.

Turning now to the drawings in more detail, numeral 10 designates the infant stroller. The stroller 10 comprises a sturdy frame 12 that is composed of several sub-assemblies and flexible elements, such as a canopy cover and a seat.

The frame 12 is supported by four wheel sets—two front wheel sets 14, 16 and two rear wheel sets 18, 20. The front wheel set 14 has a pair of rotating wheels 14a and 14b that swivel and rotate about a swivel rod 15. The front wheel set 16, similarly has a pair of rotating wheels 16a and 16b that rotate and swivel about a common swivel rod 17. The rear wheels 18 and 20 are connected by a common axle rod 22 that facilitates rotation of the rear wheels 18 and 20 in unison.

The frame assembly 12 comprises a U-shaped handle 30 which has a first elongate bar 31 and a second elongate bar 32 connected by a cross member 34. A friction sleeve 36 is positioned on the cross member 34. The sleeve 36 is formed from a resilient flexible material that ensures comfortable grip on the handle 30 by a caregiver.

The brace assembly 12 further comprises an outer frame sub-assembly and an inner frame subassembly. Generally, the inner frame supports the seat and the floor member. The outer frame subassembly generally supports the inner frame, the wheels and the handrail. The outer frame subassembly comprises a first rear diagonal brace 38, to which a lower end 37 of the elongate bar 31 is secured, and a second rear diagonal brace 40, to which the lower end 39 of the elongate bar 32 is secured. The upper ends of the rear diagonal braces 38 and 40 are secured to a bottom of a handrail 42.

The outer frame assembly further comprises a pair of front diagonal braces 46, 48, which are bent in the very front portions to extend at an angle greater than 90-degrees to be secured to a horizontal front brace 90. The first front diagonal brace 46 has an upper end 47 secured to the handrail 42, while its lower bent end 49 is secured to the horizontal front brace 90 adjacent the swivel rod 15. The second front diagonal brace 48 has an upper end 50, which is secured to the handrail 42 and a lower end 51 which is secured to the horizontal front brace 90 at a location adjacent the swivel rod 17.

The outer frame assembly also comprises a canopy frame 60, which has four struts 61, 62, 63, and 64 secured together to form a rectangle. The side struts 61 and 62 each have downwardly depending strut extensions 65 and 66, respectively. The strut extensions 65 and 66 are each secured to a cross strut 68, which extends between the handle bars 31 and 32 adjacent the top portion of the handle 30. A canopy cover 134 is stretched between the struts 61, 62, 63 and the cross strut 68.

The handrail 42 has a generally U-shaped configuration with spaced-apart side rails 70, 71 having free ends attached to the handle bars 31, 32 a distance below the canopy. The handrail is formed from a sturdy material having a non-slip covering to prevent an infant holding onto the handrail from loosing grip on the handrail while standing.

The side rail 70 is supported by the diagonal braces 40 and 46, while the side rail 71 is supported by the diagonal braces 38, 48. A front rail 73 connects the parallel side rails 70, 71. The length of the side rails 70, 71 allows a child to stand clear of the seat, while holding onto the side rails 70, 71 or the front rail 73.

An inner frame sub-assembly comprises a pair of lateral rods 80, 82 which are secured to extend in parallel relationship to each other and to the side rails 70, 71. The lateral rod 80 is secured to the seat back rod 104 at a location below the side rail 71 at one end, and to a cross rod 84—at its other end. The lateral rod 82 is secured to the seat back rod 104 at a location below the handrail 70 at its one end, and to the cross rod 84—at its other end. The lateral rods 80, 82 extend inwardly of the front and rear diagonal braces and inwardly of the handrail 42. The cross rod 84 intersects the forward most ends of the lateral rods 80, 82, extending at a right angle thereto.

A pair of inner front diagonal rods 86, 87 extend forwardly and downwardly from the cross rod 84 and are secured at the opposite ends to a front cross support member 116 above the front wheels 14a, 14b and 16a, 16b. The inner diagonal rods 86, 87 extend in parallel relationship to each other to the front diagonal braces 46, 48, respectively.

Figure 3:
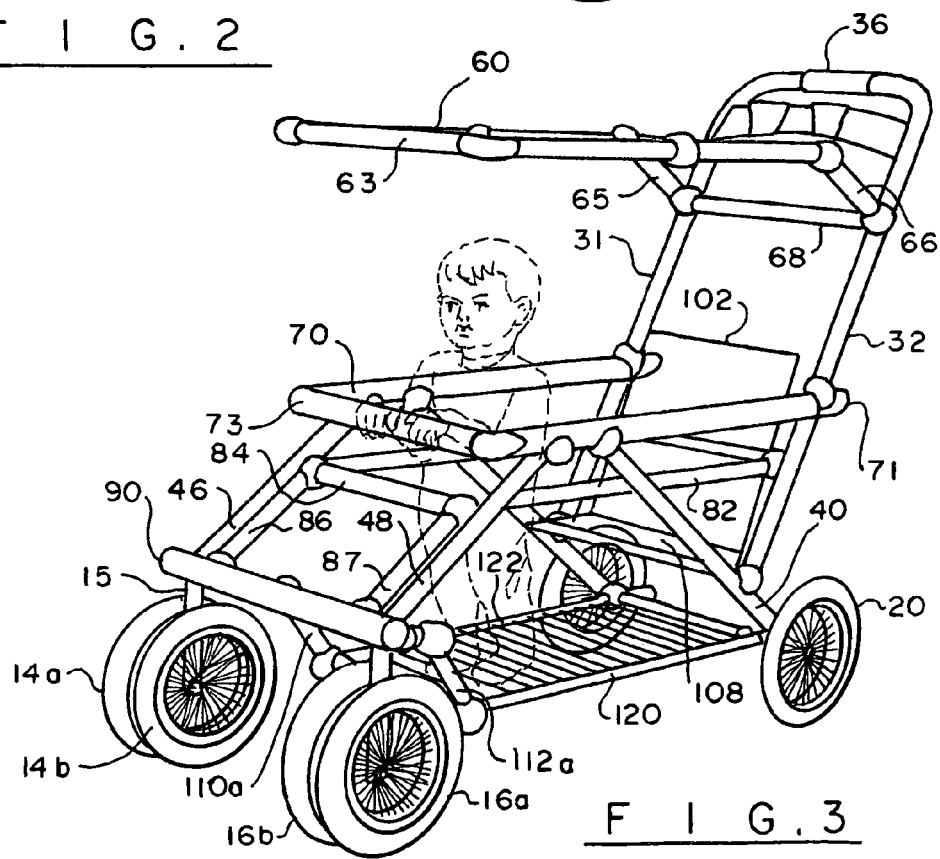
FIG. 3 is a perspective view of the infant stroller frame, with a canopy cover, front wall and sidewalls removed for clarity, showing the infant in a standing position.

A seat 100 is positioned in the rear portion of the frame 12, with the back 102 of the seat 100 extending between the lateral rods 80, 82 and the seat back rod 104. As can be seen in FIG. 3, the seat back rod 104 is attached to the lateral rods 80, 82 behind the seat back 102. The base 106 of the seat 100 is stretched on a bottom support bar 108, which is secured at opposite ends to the rear diagonal braces 38, 40 of the outer frame subassembly. The back portion of the seat 102 and the base 106 of the seat 100 are made from a flexible material that allows a comfortable seating for an infant. If desired, restraining devices, such as belts, shoulder harness, etc. may be provided in the seat 100.

A floor member 120 extends between the axle rod 22 in the back and a floor front rod 114 in the front. The floor front rod 114 is secured between a pair of bent brackets 110 and 112. Each of the bent brackets 110 and 112 are composed of two parts, a lower part 110a, 112a, respectively, an upper part 110b and 112b, respectively. The bent bracket parts 110a and 112a are mirror images of each other, and the bent bracket parts 110, 112b are also mirror-images of each other. The upper bent bracket parts 110b and 112b are secured in a spaced-apart parallel relationship to each other and to the front cross support member 116, which completes the inner frame subassembly of the frame 12. The front cross support member 116 is attached to the horizontal front brace 90 of the outer assembly.

The floor member 120 is composed of the main floor portion 122 and an upwardly extending portion 124, which extends at an obtuse angle in relation to the floor main portion 122. The floor reinforcing bars 126, 128 extending along opposite sides of the floor main portion 122, while the bent brackets 110, 112 support the floor upwardly extending portion 124. The floor reinforcing bars 126, 128 are attached to the axle rod 22 in the back and to the lower bent bracket parts 110a and 112a—in the front.

The frame 12 supports the body of the stroller 12. As can be seen in FIG. 1, the stroller 10 comprises a pair of sidewalls 130 (only one sidewall 130 can be seen in this view), a front wall 132 and a canopy cover 134. The sidewalls 120, the front wall 132 and the canopy cover 134 may be decorated with various designs, advertising slogans and the like.

Figure 4:
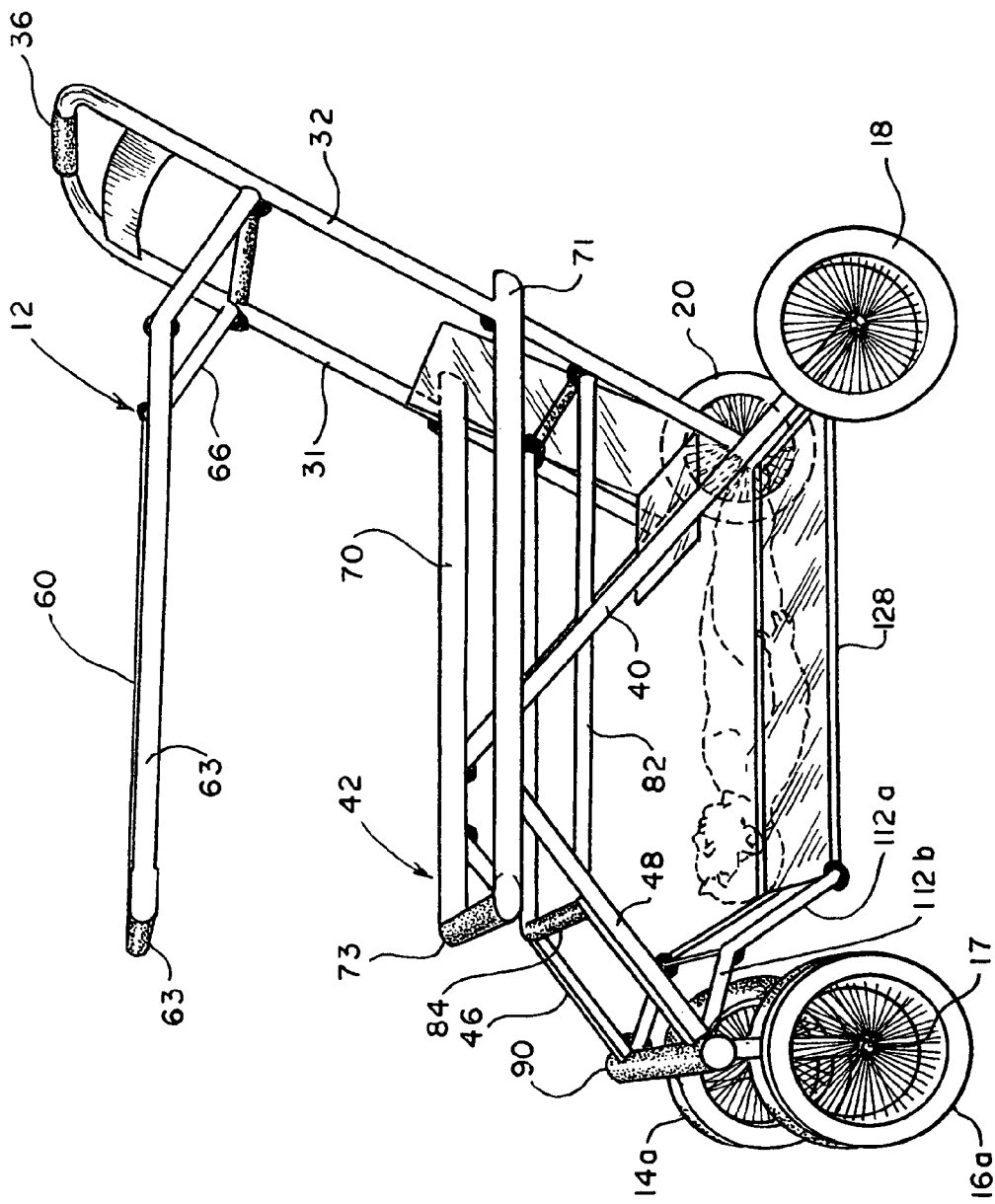
FIG. 4 is a perspective view of the infant stroller frame, with a canopy cover, front wall and sidewalls removed for clarity, showing the infant in a lying down position.
Figure 5:
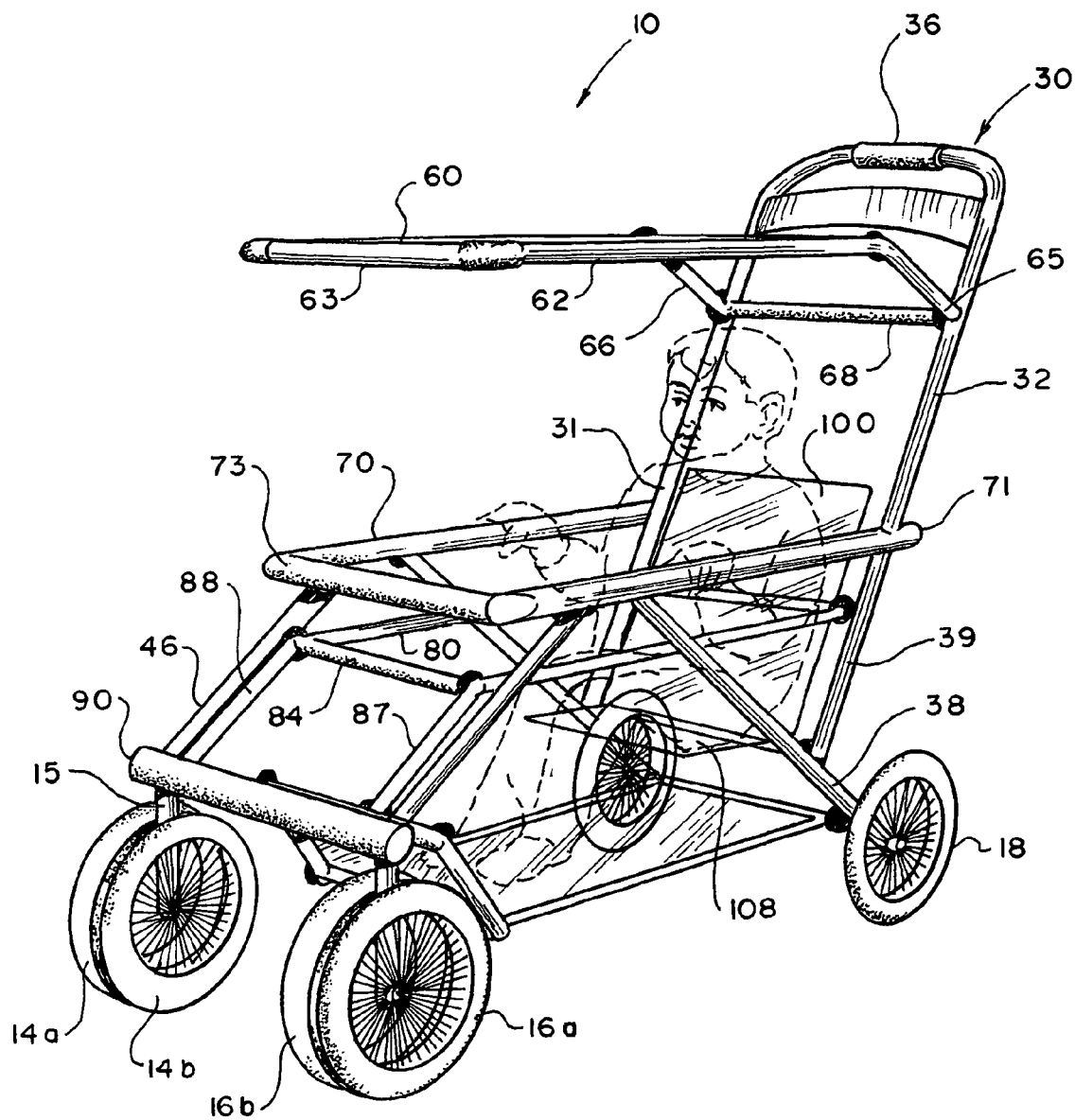
FIG. 5 is a perspective view of the infant stroller frame, with a canopy cover, front wall and sidewalls removed for clarity, showing the infant in a seated position.
Figure 6:
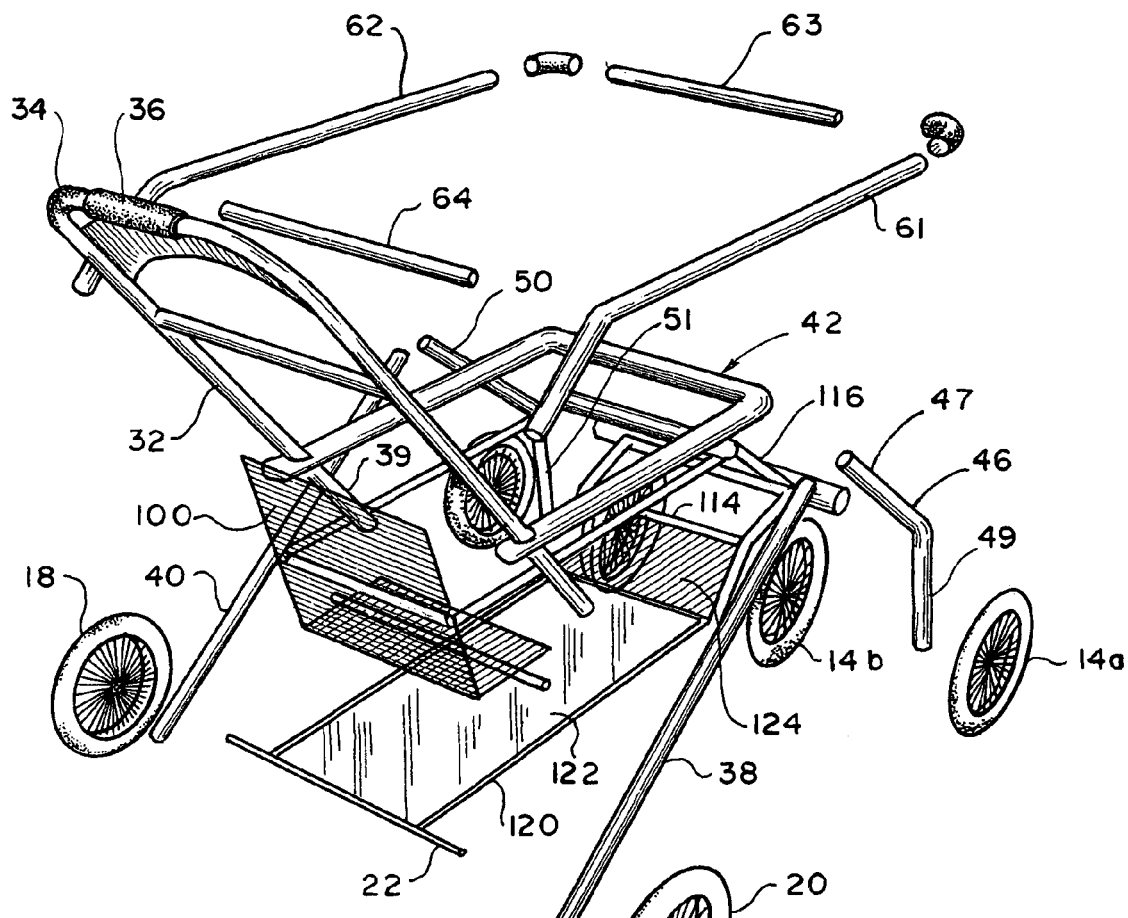
FIG. 6 is a partially exploded view of the infant stroller according to the instant invention.
Figure 7:
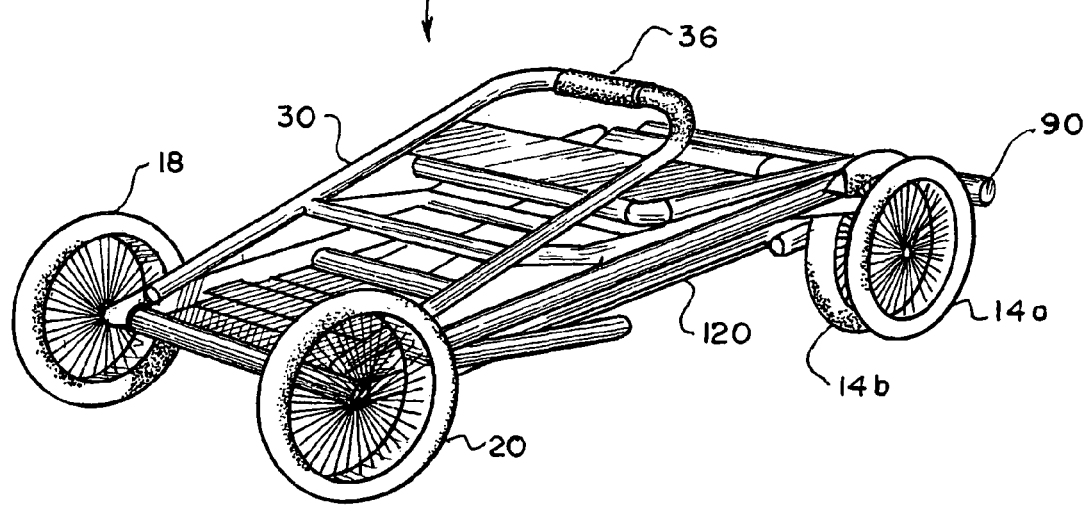
FIG. 7 is a perspective view of the stroller in a folded position.

The sidewalls 130 and the front wall 132 substantially enclose the inner frame, preventing an infant from falling out of the stroller 10. While placed in the stroller 10, the infant can sit in the seat 100 (FIG. 5), stand and hold the handrail 42 (FIG. 3), or lie down on the floor 120 (FIG. 4). As can be seen in the drawings, there is sufficient space between the edge of the seat 100 and the handrail 42, allowing the child to stand comfortably in the front of the stroller 10.

The frame 12 is movable between unfolded and folded positions (FIG. 8) due to the provision of multiple hinge connections in the frame 12. If desired, a pocket may be attached to the back surface of the seat 100 to allow a caregiver to store small articles such as diapers, bottles, or a purse. Alternatively, a hook may be secured to the seat 100 to provide a hanging structure for miscellaneous articles.

The floor member 120 may be formed from a relatively rigid material to allow the child a firm footing. At the same time, the surface of the floor member 120 may be formed from a somewhat soft, resilient material, such as for instance used in trampolines. The frame members are formed of a metal, plastic, or composite tubing which is selected and configured to provide sufficient strength to bear the weight of the interlocking component parts of the stroller 10, plus the weight of any child carried therein and any other materials carried thereon.

If desired, the rotating wheel sets 14, 16, 18 and 20 may be rotatable about both horizontal and vertical axes to allow increased stability and maneuverability to the stroller 10. In one of the preferred embodiments, the front wheel sets 14 and 16 comprise swivel wheel sets. The seat 100 may be padded or supplied with detachable pillows to increase the comfort of the child being transported in the stroller 10.

The stroller 10 may be provided with a variety of restraining devices to be used while the infant is in a seated or standing position, such as a safety belt, a harness, shoulder straps, or another similar conventional mechanism to prevent the child from falling during transportation in the stroller 10.

The stroller of the present invention provides an alternative to a conventional stroller, where a child remains in a seated restraint for long periods of time. The foldable collapsible frame is lightweight and compact. The stroller can be manipulated between the unfolded and folded position with ease by one caregiver. In a collapsed folded position, the stroller can be stored in a trunk of a passenger car.

Many changes and modifications can be made in the design of the present invention without departing from the spirit thereof. I, therefore, pray that my rights to the present invention be limited only by the scope of the appended claims.

We claim:

1. A stroller for transporting an infant selectively in a standing, seated, and lying down position, comprising:
   an outer frame subassembly comprising a set of front diagonal braces and a set of rear diagonal braces, swivel front rotating wheel sets connected by a front cross bar and rear rotating wheel sets, lower ends of the front diagonal braces being secured to the front cross bar, a stroller handle extending upwardly in relation to the set of diagonal braces and secured to lower ends of the rear diagonal braces, and a handrail secured to the stroller handle, said handrail comprising a generally U-shaped member having a pair of spaced-apart side rails secured to the stroller handle and the diagonal braces, and a front rail connecting forward ends of the side rails; and an inner frame subassembly secured inside the outer frame subassembly and supporting a seat and a floor member mounted below the seat, said inner frame subassembly comprising a pair of spaced-apart lateral rods secured to extend in parallel relationship to each other and inwardly of said diagonal braces, a first end of each of said pair of lateral rods being secured to a seat back rod at a location below the handrail, each of said pair of lateral rods has a second end, said inner frame subassembly further comprising a second cross rod connecting second ends of each of the pair of lateral rods, and wherein said inner frame subassembly further comprises a pair of diagonal rods secured at first ends to opposing ends of the second cross rod and at second ends to the front cross rod, said inner diagonal rods being positioned forwardly and downwardly in relation to the second cross rod.

2. The apparatus of claim 1, wherein said inner frame subassembly further comprises a front cross support member mounted forward of said cross rod, and wherein each of said pair of inner diagonal rods is secured at their second ends to the front cross support member.

3. The apparatus of claim 2, wherein said rear wheel sets are connected by a common axle rod configured to facilitate rotation of the rear wheel sets in unison.

4. The apparatus of claim 3, wherein the floor member is suspended between said common axle rod and the front cross member.

5. A stroller for transporting an infant selectively in a standing, seated, and lying down position, comprising:

an outer frame subassembly comprising a set of front diagonal braces and a set of rear diagonal braces, swivel front wheel sets connected by a front cross bar and rear rotating wheel sets connected by a common axle for rotation in unison, lower ends of the front diagonal braces being secured to the front cross bar, a stroller handle extending upwardly in relation to the set of diagonal braces and secured to lower ends of the rear diagonal braces, and a handrail secured to the stroller handle; and an inner frame subassembly secured inside the outer frame subassembly and supporting a seat and a floor member mounted below the seat, said inner frame subassembly comprising a pair of spaced-apart lateral rods secured to extend in parallel relationship to each other and inwardly of said diagonal braces, a first end of each of said pair of lateral rods being secured to a seat back rod at a location below the handrail, each of said pair of lateral rods has a second end, said inner frame subassembly further comprising a second cross rod connecting second ends of each of the pair of lateral rods, and wherein said inner frame subassembly further comprises a pair of diagonal rods secured at first ends to opposing ends of the second cross rod and at second ends to the front cross rod, said inner diagonal rods being positioned forwardly and downwardly in relation to the second cross rod.

6. The apparatus of claim 5, wherein said inner frame subassembly further comprises a front cross support member mounted forward of said cross rod, and wherein each of said pair of inner diagonal rods is secured at their second ends to the front cross support member.

7. The apparatus of claim 6, wherein the floor member is suspended between said common axle rod and the front cross member.

* * * * *